Dec. 3, 1929.　　　　F. SESTI　　　　1,738,398
MEANS FOR PRESENTING COMPOSITE DESIGNS
Filed Nov. 15, 1927　　　8 Sheets-Sheet 1

Inventor
Ferdinand Sesti
By C. M. Clarke
Attorney

Dec. 3, 1929.  F. SESTI  1,738,398
MEANS FOR PRESENTING COMPOSITE DESIGNS
Filed Nov. 15, 1927   8 Sheets-Sheet 2
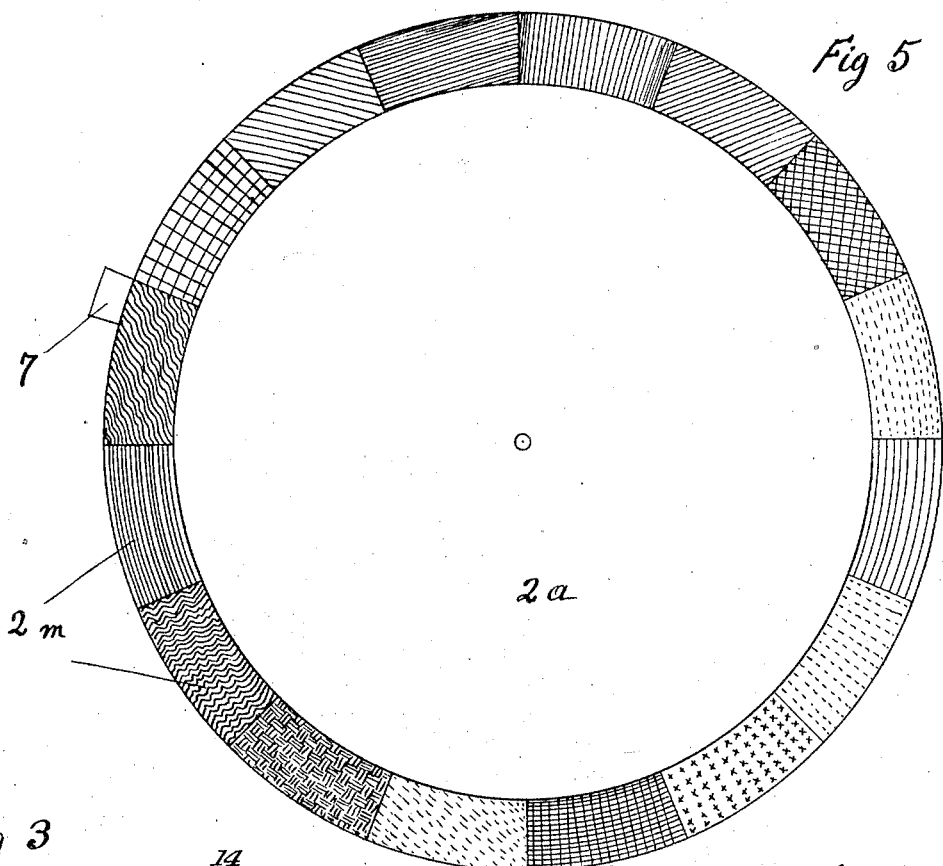
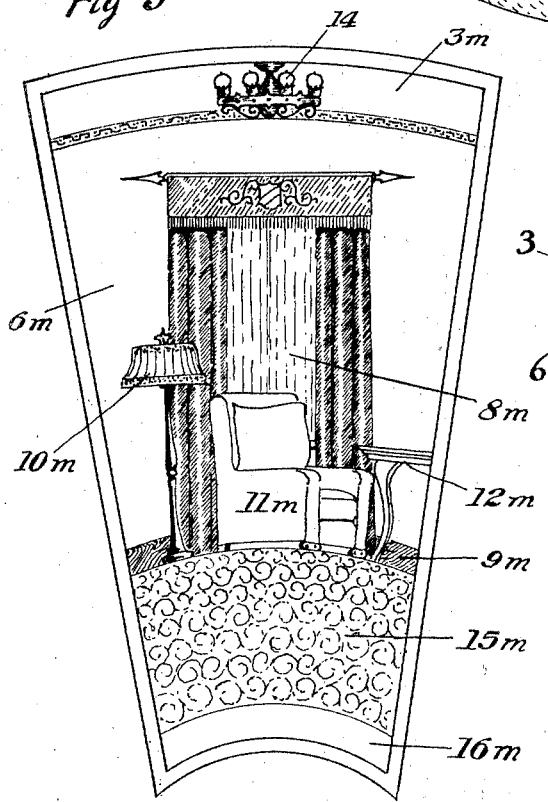
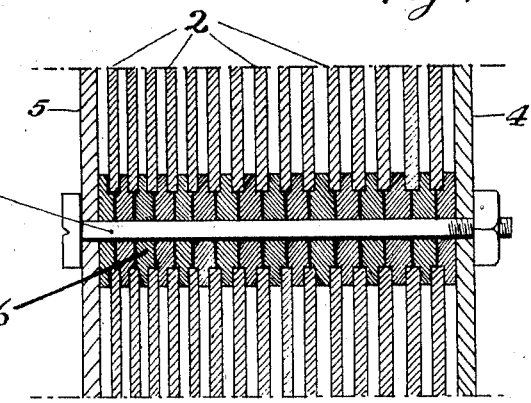

Dec. 3, 1929.   F. SESTI   1,738,398
MEANS FOR PRESENTING COMPOSITE DESIGNS
Filed Nov. 15, 1927   8 Sheets-Sheet 3

Inventor
Ferdinand Sesti
By C. M. Clarke
Attorney

Dec. 3, 1929.  F. SESTI  1,738,398
MEANS FOR PRESENTING COMPOSITE DESIGNS
Filed Nov. 15, 1927  8 Sheets-Sheet 4
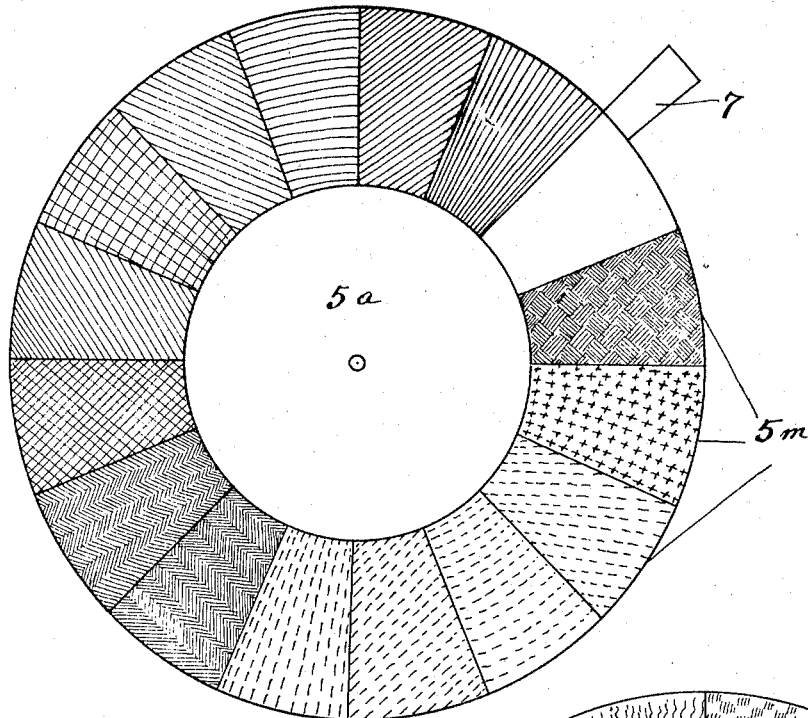
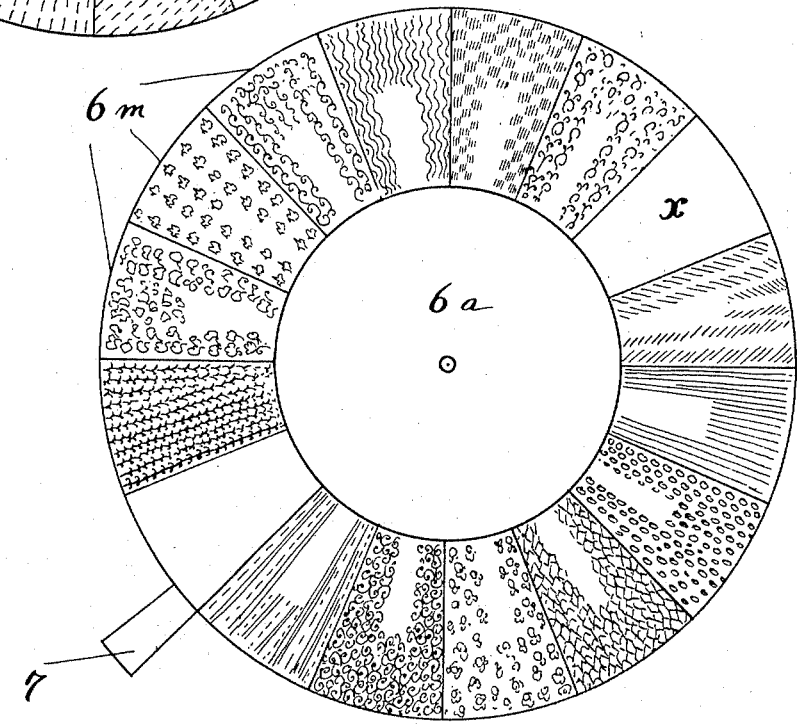
Inventor
Ferdinand Sesti
By C. M. Clark
Attorney

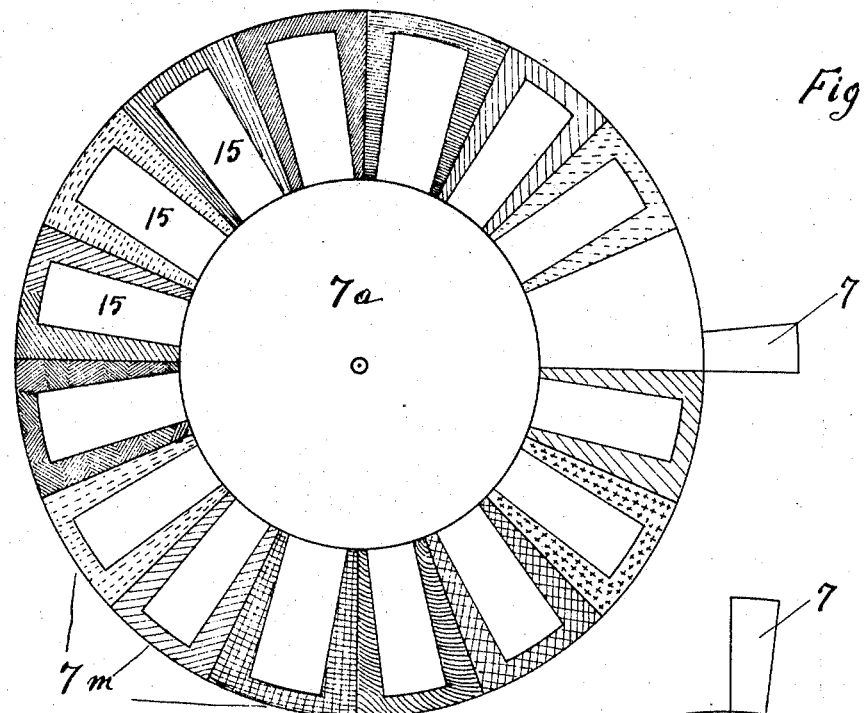
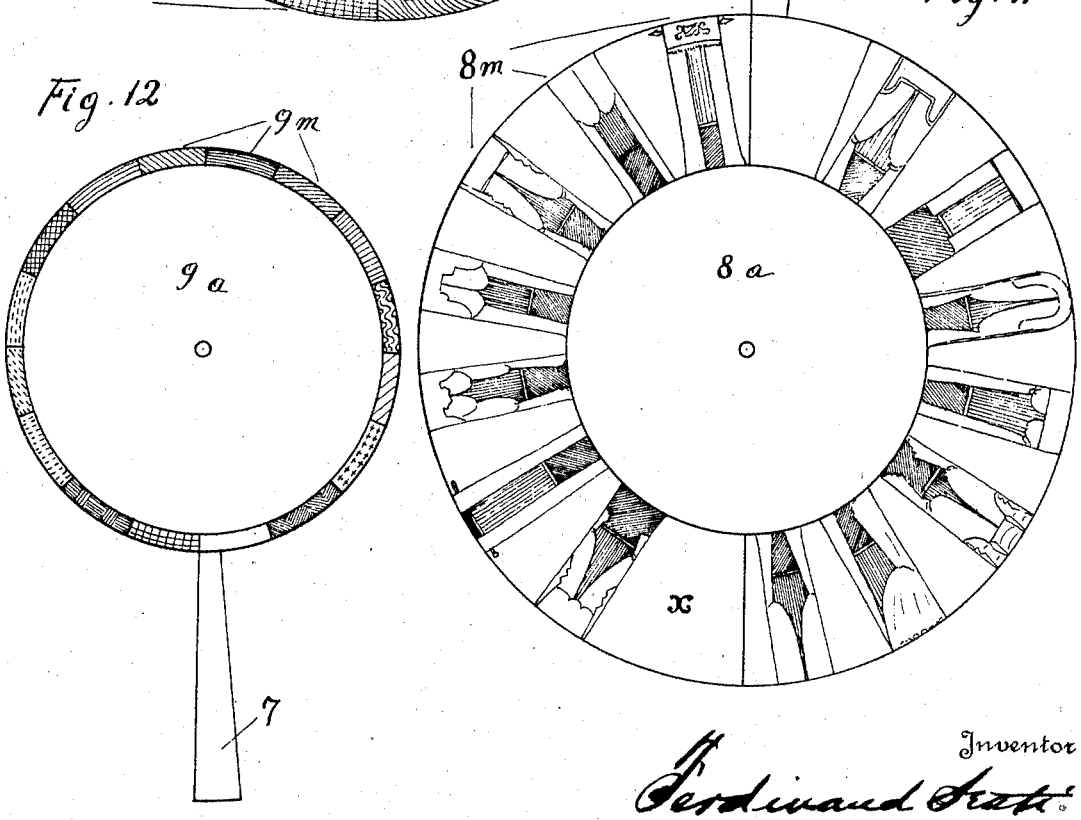

Dec. 3, 1929.     F. SESTI     1,738,398
MEANS FOR PRESENTING COMPOSITE DESIGNS
Filed Nov. 15, 1927     8 Sheets-Sheet 6
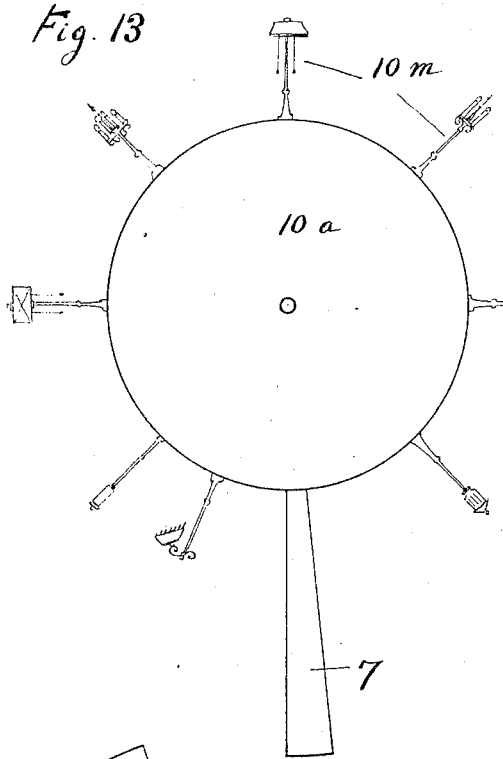
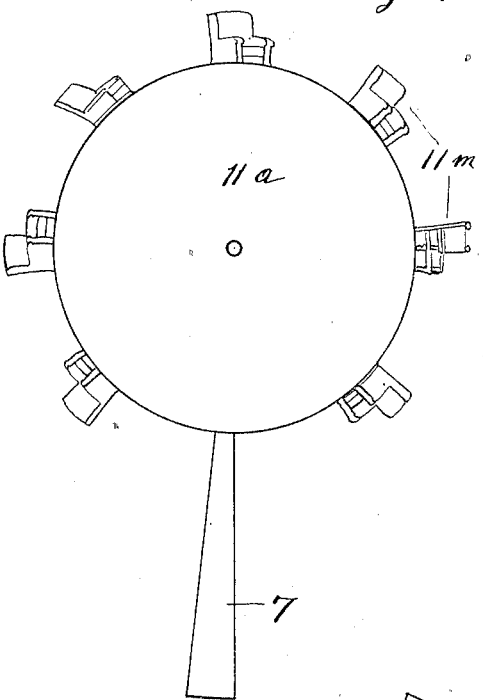
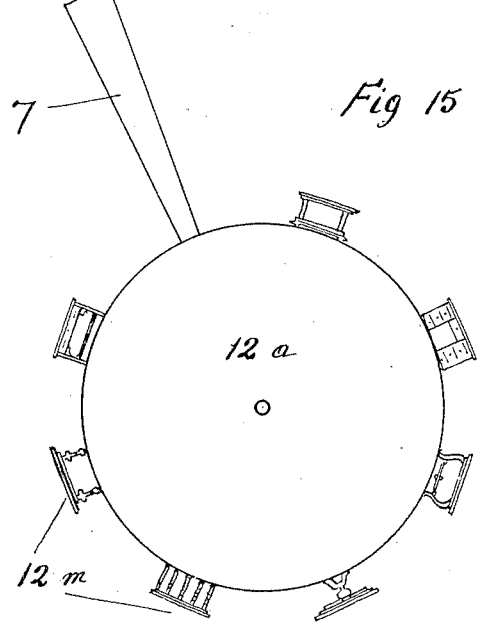
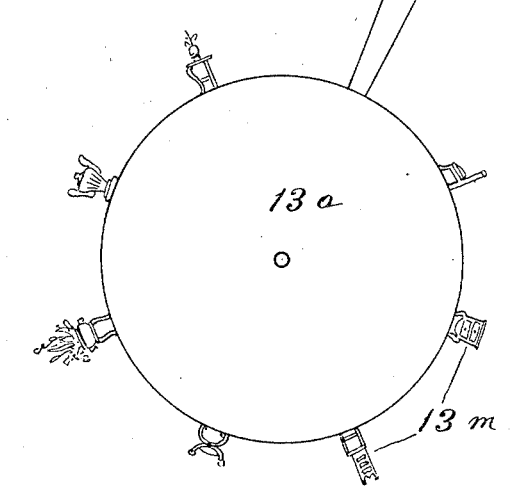
Inventor
Ferdinand Sesti
By C. M. Clarke
Attorney Dec. 3, 1929.  F. SESTI  1,738,398
MEANS FOR PRESENTING COMPOSITE DESIGNS
Filed Nov. 15, 1927   8 Sheets-Sheet 7

Inventor
Ferdinand Sesti
By C. M. Clarke
Attorney

Dec. 3, 1929. F. SESTI 1,738,398
MEANS FOR PRESENTING COMPOSITE DESIGNS
Filed Nov. 15, 1927    8 Sheets-Sheet 8

Inventor
Ferdinand Sesti
By C. M. Clarke
Attorney

Patented Dec. 3, 1929

1,738,398

UNITED STATES PATENT OFFICE

FERDINAND SESTI, OF PITTSBURGH, PENNSYLVANIA, ASSIGNOR TO KAUFMANN DEPARTMENT STORES, INC., OF PITTSBURGH, PENNSYLVANIA, A CORPORATION OF NEW YORK

MEANS FOR PRESENTING COMPOSITE DESIGNS

Application filed November 15, 1927. Serial No. 233,446.

My invention, which I call sketchscope, is an improvement in the art of presenting composite values as to design, shape and color by means of a plurality of superimposed cooperating units, in series.

The object in view is to provide means for presenting to view within a definite space or area a series of surfaces, each having an individual design, shape or color, adapted to present a constantly varying composite effect or picture. As herein disclosed, the invention is illustrated as applied to the art of interior decoration for the purpose of presenting for selection a serial succession of different combinations. Thus, for the purpose of showing the main color values and elements of a room or the like, I combine a ceiling effect, a well effect, a base board effect, a door or window with draperies therefor, a carpet or rug effect with a border therefor, together with the capacity of showing many variations and combinations as to design, shape or color, and with supplemental incidents of individual units representing lighting fixtures, articles of furniture, etc.

In the art of interior decoration it is ordinarily usual to prepare separate entire sketches of such portions as make up the entire ensemble for approval and selection by a customer, all of which entail considerable expense and time, for a final single selection, if any.

By my invention I utilize in a comparatively simple manner, a number of serial disks or strips, each having within a standard prescribed area or exposure surface, a unitary characteristic portion adapted to be brought into register with a corresponding portion of one or more similar series, so as to quickly assemble all of the several elements of a number of such unitary portions, for a complete harmonizing or contrasting design.

While the invention is not strictly limited to the particular purpose of showing proposed complete design, shape and color schemes for interior decoration, and may be utilized for other more or less similar uses and allied trades, the following description will suffice to make its construction, functions, operation and utilization amply clear to those skilled in the art.

As herein shown and described the invention provides means, in the form of a series of superimposed disks, of maximum, intermediate, and minimum diameter, each having standard degree registering segmental unitary portions of the character noted.

These are individually rotatable, mounted on a common supporting stem or shaft, between a supporting main back and front frame with lateral clearance for rotational manipulation, an exposure window or space in the front frame, and with other features and individual characteristics, as will be more specifically described.

Referring to the drawings showing one preferred embodiment of the invention:

Fig. 3 is an enlarged face view of the sight opening; visor or window, exposing one of the combined pictures;

Fig. 4 is an enlarged sectional view through the middle of the device, showing the mounting of the several disks;

Fig. 5 is a face view of the ceiling color dial;

Fig. 8 is a face view of the drapery color dial;

Fig. 9 is a face view of the drapery pattern dial;

Fig. 10 is a face view of the apertured wall surface dial;

Fig. 11 is a face view of the orifice drapery dial, showing drapery outline and treatments;

Fig. 12 is a face view of the base board dial;

Figs. 13, 14, 15 and 16 are face views of individual furnishings or piece dials;

Figure 2:
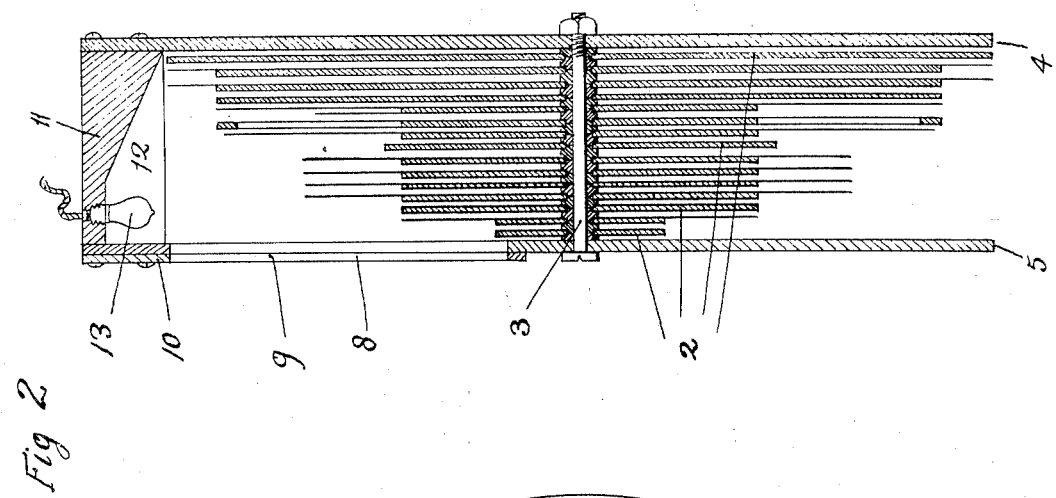
Fig. 2 is a vertical sectional view on the line II—II of Fig. 1.

The device as a whole comprises an entire series of plural segment disks 2 each individually rotatable on a supporting shaft 3 extending through the middle and fixedly connecting the back piece or wall 4 and the front piece or wall 5, by its terminal head and nut, as in Fig. 4.

The several disks, which may be of metal, wood, card board or other suitable thin strong material are spaced apart by stationary shouldered washers 6, so that each disk may be individually turned without imparting frictional movement to the next adjacent disk. Each disk is provided with a radially extending turning handle or arm 7 by which it may be adjusted to bring its particular segmental section into registering position with a segmental sight opening 8 in the front wall 5.

Such opening is preferably covered by a window 9 of celluloid or glass held by a surrounding frame 10.

In addition to the bolt 3 the back and front walls 4 and 5 are firmly connected at the top by a spacing bridge piece 11 whereby the otherwise open sided casing is held in operative position, with annular clearance for the handles. The connecting top piece 11 is held by screws or otherwise to the back and front walls, and is preferably recessed as at 12 and provided with a lamp 13 for illumination of the associated unitary portions of the several disks, observable through the window opening 8.

As shown, the several disks 2 are superimposed, and decrease in diameter from the back towards the front in stepped relation, although two or more disks may be of the same diameter. This arrangement is for the purpose of bringing into the selected composition various elements from the top to the bottom of the segmental scope of the picture, by adjusting the several peripheral indicating portions of the disks at the varying height positions determined by their diameters.

Certain of the disks are provided with representative portions showing outline or color by the opaque substance of the disk itself, while others are provided with peripheral portions of transparent material as celluloid, for imposing a pattern or figure against the next surface beyond, with accompanying visibility.

The peripheral portion of each disk is segmentally divided, preferably in a ratio common to all, into a suitable number of sections approximating that portion of the window opening providing for exposure. Certain of the smaller or front disks may however contain a less number of illustrating elements dependent on their character and use.

The majority of the larger and medium sized disks, except the innermost one, are provided with a blank or open space $x$ so as to ensure the possibility of adjusting such disks to a non-interfering position with relation to anything behind it.

In applying the invention to use in connection with the art of interior decoration the rearmost and maximum diameter disk $2^a$, Fig. 5, is provided with a suitable number, say sixteen, of equally spaced segmental spaces $2^m$ comparatively narrow in depth. These are variously colored, for representing ceiling colors.

The next adjacent disk $3^a$ of smaller diameter is provided with a segmentally divided corresponding series of transparent sections $3^m$ of celluloid, adapted to overlie the spaces $2^m$.

These sections $3^m$ are provided with various pattern configurations as shown, so that by adjustment any one of such patterns may be imposed upon any one of the colored sections $2^m$ behind.

The next disk $4^a$ is similar to disk $3^a$ having a similar series of overlapping transparent sections $4^m$ of celluloid.

Figure 7:
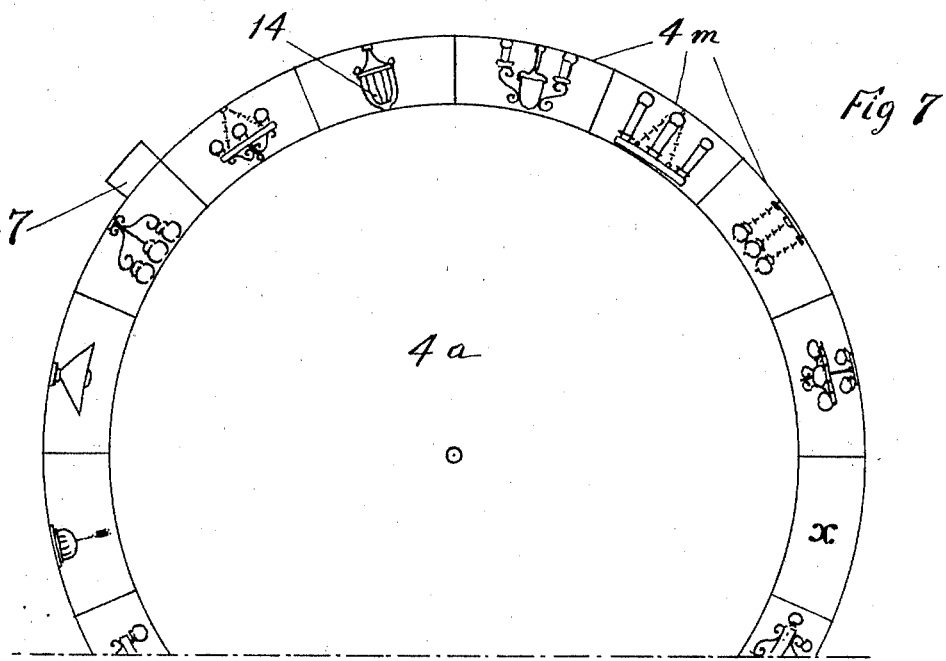
Fig. 7 is a face view of the light fixtures dial.

These are provided with a series of light fixtures or chandeliers 14 painted or otherwise placed on sections $4^m$, as in Fig. 7, adapted to be located across the ceiling section, as preferred.

Disk $5^a$, Fig. 8, is next in the series and is of less diameter, having a corresponding series of segmental spaces $5^m$ extending inwardly from the inner radius of outermost ceiling segments $2^m$ for a sufficient depth to provide a color background for the drapery unit segments of dial $8^a$, Fig. 11. Segments $5^m$ are each individually colored or tinted to show through the superimposed transparent figured segments of dial $6^a$, Fig. 9. Said dial $6^a$ is likewise provided with segments $6^m$ of celluloid, of the same size as segments $5^m$, provided with figured patterns as shown, adapted to be imposed against the color segments $5^m$ on their transparent bases.

The next dial $7^a$, Fig. 10, is of the same size and is provided with proportional segmental divisions as in dials $5^a$ and $6^a$, having segmental spaces $7^m$ surrounding a middle aperture or clearance opening 15 in each segment. The body portion of each segment $7^m$ is opaque, and each is tinted or colored in a distinctive color for wall or wallpaper representation.

The opening 15 is for exposure of one of the rear color segments 5$^m$ through the figured segments 6$^m$, and the superimposed celluloid drapery treatment elements of the next outermost dial 8$^a$, Fig. 11. Said dial 8$^a$ is comparatively small as to its circular base portion, and is provided with the radially extending drapery treatment units 8$^m$. These units, of celluloid or the like, are in various arrangements and designs of drapery treatments, simulating a door or window opening, with the drapery outline thereof, as shown. When one such unit is located in register with opening 15 of dial 7$^a$ and over the figured segment 6$^m$ and the drapery color segment 5$^m$, the color and figure effect is combined with the drapery treatment outline, surrounded by the particular wall color showing of segment 7$^m$, beneath the ceiling and light fixture elements above described.

The next dial 9$^a$, Fig. 12, of reduced diameter, is provided with a corresponding series of annular rim segments 9$^m$ variously painted or colored to simulate and represent a base board effect.

The next dial, 10$^a$, Fig. 13, is similar to dial 8$^a$ in being provided with a series of radially extending shaped units 10$^m$, representing a floor lamp or similar element, adapted to be suitably located by representation, with relation to the other component members of the entire scheme.

Dial 11$^a$, Fig. 14, is similar in construction, arrangement and use, having a series of radially extending comparatively small furniture, as chair elements 11$^m$, adapted to be similarly located and combined.

Likewise, dial 12$^a$, Fig. 15, is provided with a series of radially arranged additional elements or units 12$^m$, representative of some other contrasting furniture unit, as a table, in the general combination or scheme.

The next unit 13$^a$, Fig. 16, is similarly provided with radially extended odd piece units 13$^m$, as a small chair or stool, for the same general purpose.

Figure 17:
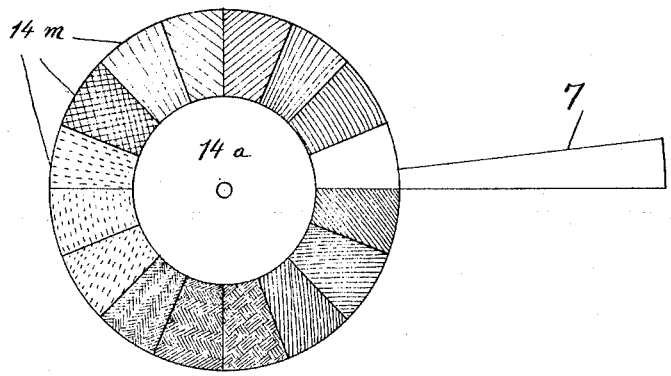
Fig. 17 is a face view of a carpet or rug color dial.

The next dial 14$^a$, Fig. 17, is comparatively small, and is, like dials 2$^a$ and 5$^a$, provided with corresponding segmental sections 14$^m$, each differently colored and adapted to represent a carpet or a rug color or shade.

Figure 18:
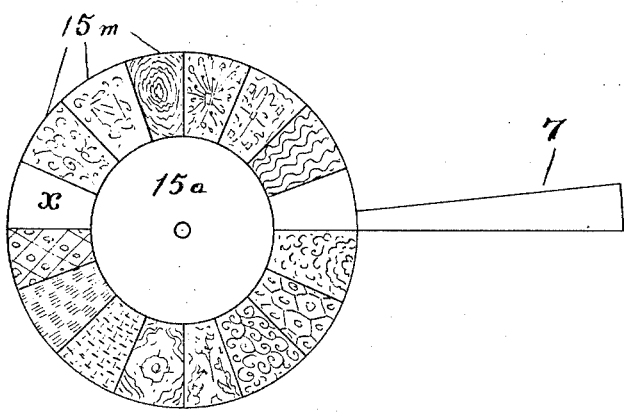
Fig. 18 is a face view of a carpet or rug figure dial.

Imposed upon dial 14$^a$ is the next dial 15$^a$, Fig. 18, having a celluloid rim, similarly divided into corresponding segments 15$^m$, each provided with a different configuration or pattern, traced on or otherwise applied to the celluloid section, for combination with the colored segment beneath it.

Figure 19:
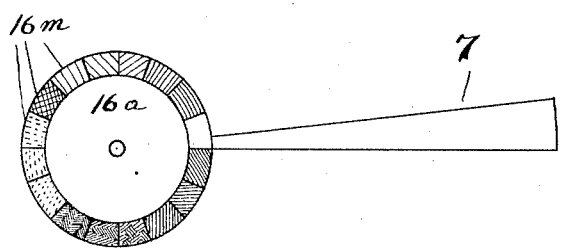
Fig. 19 is a face view of a carpet or rug border color dial.

The last dial 16$^a$, Fig. 19, has an annular series of comparatively narrow segments 16$^m$, adapted to be rotated inwardly of the segments 14$^m$ and 15$^m$, and colored to represent or show combined carpet or rug borders.

Each of the dials 3$^a$, 4$^a$, 6$^a$, 8$^a$, and 15$^a$ is provided with the blank segmental space $x$ above described, permitting either of such dials to be rotated to an inoperative or non-registering position at the will of the operator, in any combination in which either of such dials provided with the blank space is not desired to be utilized.

Figure 1:
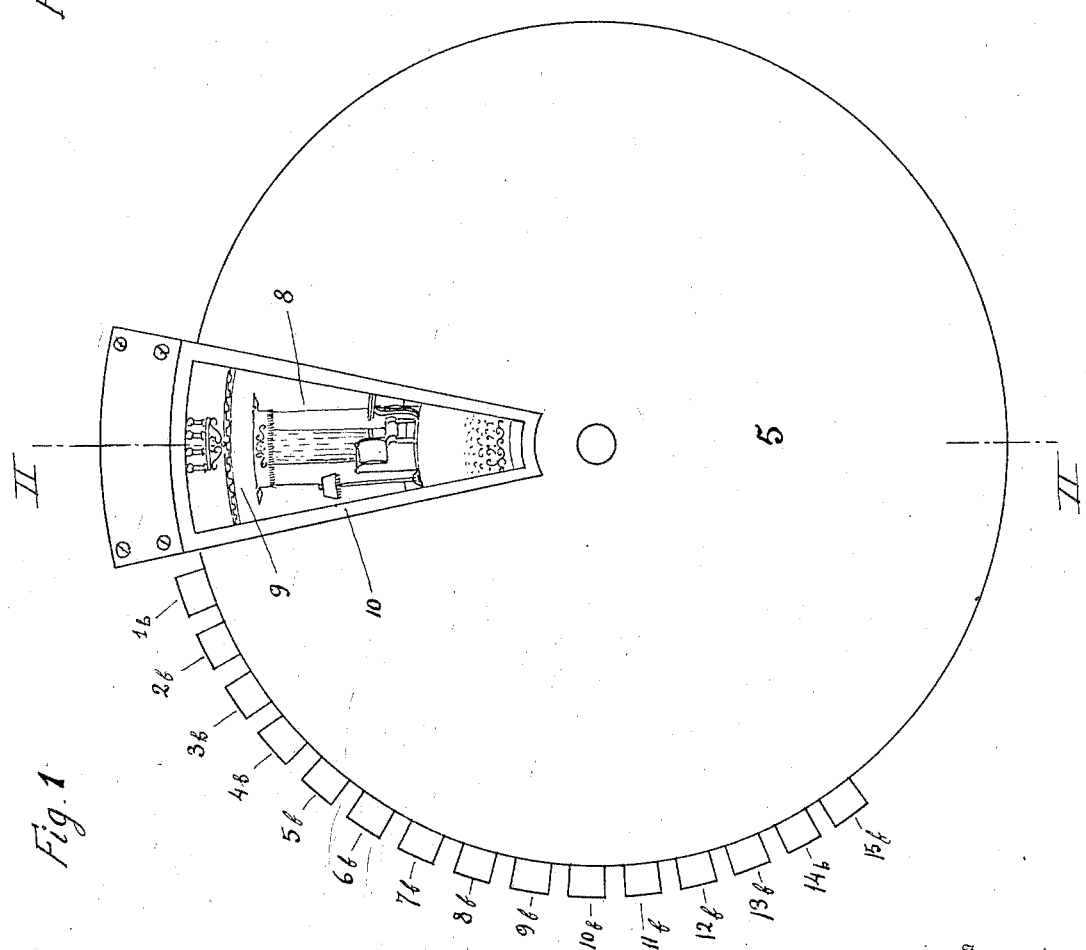
Fig. 1 is a face view of the invention in elevation, showing a characteristic picture.
Figure 6:
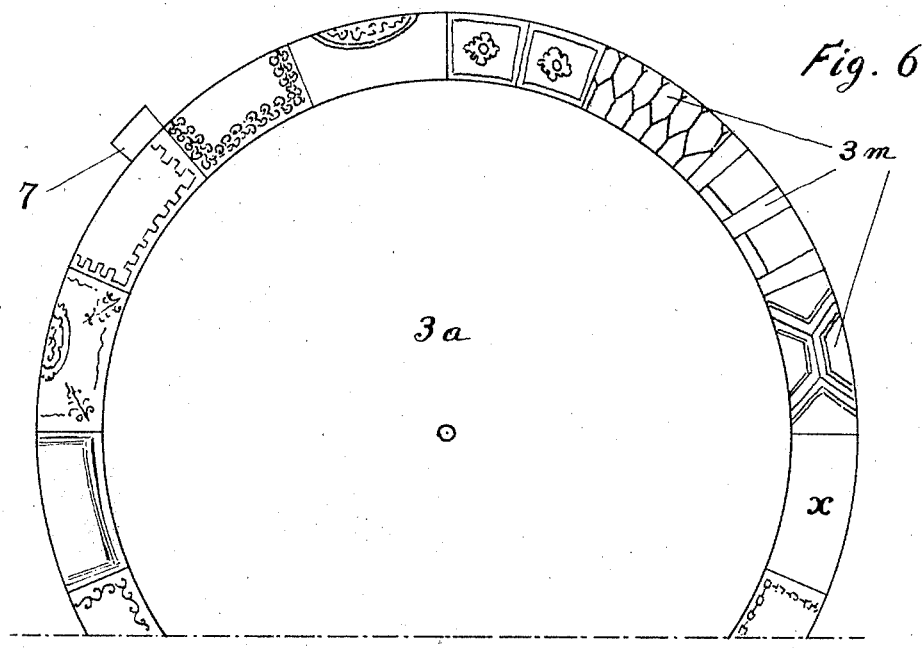
Fig. 6 is a face view of the ceiling figure dial.

The handles or arms 7 all extend outwardly slightly beyond the periphery of the front wall 5 as shown in Fig. 1, such handles or manipulating levers being a portion of or positively connected with the main dial, as shown in the different detail views. Each of such handles 2$^b$ to 16$^b$ respectively, correspond to and operate dials 2$^a$ to 16$^a$ inclusive, and may be marked or identified in any other suitable manner desired.

By such means it will be seen that each individual dial may be manipulated and located to bring its particular segmental opening or element into register with the sight opening in the front wall, with supplemental adjustment of each of the particular dials desired to be used, until the complete assemblage of illustrative units or elements is satisfactorily associated. Any suitable plan may be adopted for definitely recording any particular combination, thus produced, so that the mechanical and color scheme or effect may be duplicated or reassembled at will.

The invention provides for great flexibility of use and a practically unlimited number of combinations and effects, dependent upon the particular elemental design, color and shape of such of the elements as are used in the way above described.

When the device is thus used, partial combinations may be made, and supplemented by others, until the final effect is satisfactory and acceptable. The illumination provided ensures good visibility, and the invention will be found to present in a rapid and interesting manner a large number of various and attractive combinations for selection by anyone interested.

Figure 20:
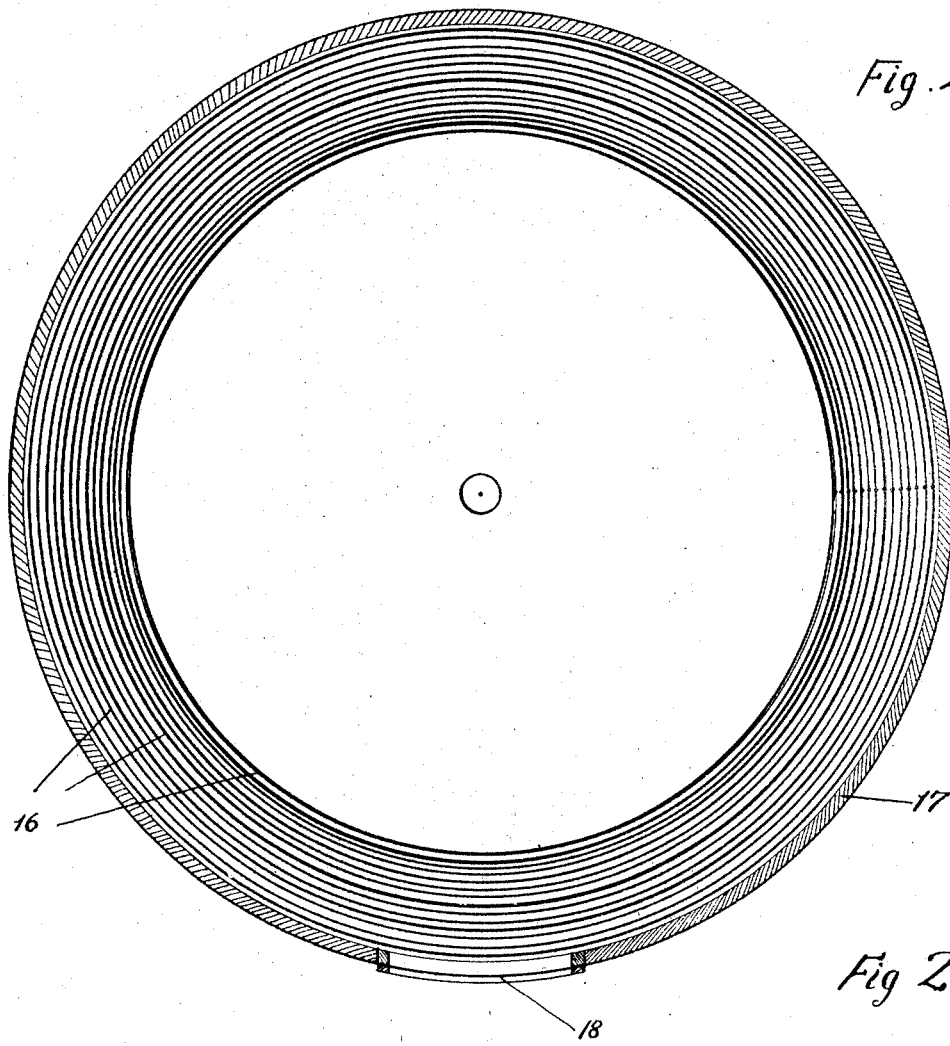
Fig. 20 is a plan view of a modified construction utilizing a series of annular space matching bands for registering position with a sight opening.
Figure 21:
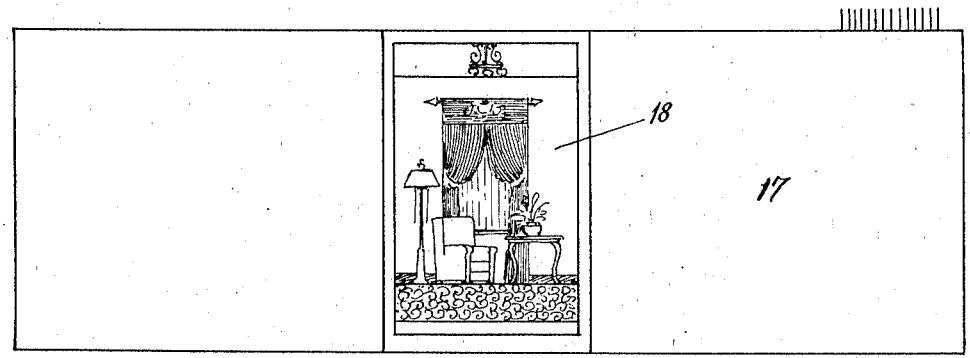
Fig. 21 is a front elevation of such modified construction.

While the construction as above described is very satisfactory, compact and efficient, it will be obvious that the same general effect may be produced by a series of annular bands 16, associated as in Figs. 20 and 21, within an outer casing or frame 17, having a sight opening 18. Bands 16 are each provided with registering openings, transparent sections, unitary figures, etc., similar to those above described, and at varying heights, so as to bring each of such unitary spaces or divisions into register with the sight opening, for presenting the same general effect as above described.

The invention may be embodied in any suitable material, or of any desired size, and may be adapted to any different suitable use or purpose, or otherwise variously changed or modified by the skilled mechanic, within the scope of the following claims.

What I claim is:—

1. A device of the character described comprising a member having an opening, and a plurality of members movably mounted one behind the other in rear of said member, one of said movable members having different colored background areas to be moved behind said opening, and another of said movable members having transparent areas to be moved behind said opening in front of the exposed background area, said transparent areas having different designs thereon to give an ornamental effect to the exposed background area such as to resemble a rug, carpet, wallpaper, curtain, drapery or the like of a selected color and design.

2. A device of the character described comprising a member having an opening, a plurality of members movably mounted one behind the other in rear of said member, one of said movable members having different colored background areas to be moved behind said opening, another of said movable members having transparent areas to be moved behind said opening in front of the exposed background area, said transparent areas having different designs thereon to give an ornamental effect to the exposed background area such as to resemble a rug, carpet, wallpaper, curtain, drapery or the like of a selected color and design, and still another movable member having representations of articles thereon adapted to be positioned behind said opening in front of the exposed design and background to provide a setting such as for a room.

3. A device of the character described comprising a member having an opening, and a plurality of members movably mounted one behind the other in rear of said member, some of said movable members having different colored background areas to be moved behind said opening and simultaneously exposed, and other of said movable members having transparent areas to be moved behind said opening simultaneously in front of the corresponding exposed background areas, said transparent areas having different designs thereon to give ornamental effects to the exposed background areas such as to resemble different parts of a room of selected colors and designs.

4. A device of the character described comprising a member having an opening, and a plurality of members movably mounted one behind the other in rear of said member, some of said movable members having different colored background areas to be moved behind said opening and simultaneously exposed, other of said movable members having transparent areas to be moved behind said opening simultaneously in front of the corresponding exposed background areas, said transparent areas having different designs thereon to give ornamental effects to the exposed background areas such as to resemble different parts of a room of selected colors and designs, and still others of the movable members having representations of articles thereon, such as chairs, tables, lamps, and the like, adapted to be positioned behind said opening in front of the exposed designs and backgrounds to provide different settings.

5. A device of the character described comprising a member having an opening, a background member in rear of said opening, and movable members between said background member and first-named member and each having representations of articles thereon adapted to be positioned behind said opening, the third-named members being spaced appreciable distances from one another and from the background member so as to provide a setting with said representations of articles standing out from the background.

6. A device of the character described comprising a member having an opening, a member movable behind the first-named member and having different background areas to be moved behind said opening, and a plurality of members movable between the first-named and second-named members and each having representations of articles thereon adapted to be positioned behind said opening, the third-named members being spaced appreciable distances from one another and from the second-named member in order that said representations of articles and background area behind the opening will provide a setting with said representations of articles standing out from the background area.

In testimony whereof I hereunto affix my signature.

FERDINAND SESTI.